(12) United States Patent
Engel et al.

(10) Patent No.: US 9,721,345 B2
(45) Date of Patent: Aug. 1, 2017

(54) METHOD AND DEVICE FOR GENERATING AT LEAST ONE VIRTUAL IMAGE OF A MEASUREMENT OBJECT

(71) Applicant: CARL ZEISS INDUSTRIELLE MESSTECHNIK GMBH, Oberkochen (DE)

(72) Inventors: Thomas Engel, Aalen (DE); Stephan Rieger, Oberkochen (DE)

(73) Assignee: Carl Zeiss Industrielle Messtechnik GmbH, Oberkochen (DE)

(*) Notice: Subject to any disclaimer, the term of this patent is extended or adjusted under 35 U.S.C. 154(b) by 0 days.

(21) Appl. No.: 14/894,121

(22) PCT Filed: May 26, 2014

(86) PCT No.: PCT/EP2014/060824
§ 371 (c)(1),
(2) Date: Nov. 25, 2015

(87) PCT Pub. No.: WO2014/191350
PCT Pub. Date: Dec. 4, 2014

(65) Prior Publication Data
US 2016/0110873 A1      Apr. 21, 2016

(30) Foreign Application Priority Data

May 27, 2013   (DE) .................. 10 2013 209 770

(51) Int. Cl.
*G06T 5/00*           (2006.01)
*G06T 7/00*           (2017.01)
(Continued)

(52) U.S. Cl.
CPC ............ *G06T 7/0065* (2013.01); *G06T 5/002* (2013.01); *G06T 15/04* (2013.01); *G06T 15/205* (2013.01);
(Continued)

(58) Field of Classification Search
CPC ....... G06T 7/0065; G06T 5/002; G06T 15/50; G06T 15/04; G06T 15/205; G06T 7/004; G09B 19/24; G09B 23/06
(Continued)

(56) References Cited

U.S. PATENT DOCUMENTS 7,254,262 B2   8/2007  Nehse et al.
7,831,105 B2   11/2010 Engel et al.
(Continued)

FOREIGN PATENT DOCUMENTS

CN         1957373 A         5/2007
CN       101807014 A    *    8/2010
(Continued)

OTHER PUBLICATIONS

Kolb, C., et al., "A Realistic Camera Model for Computer Graphics", Computer Graphics Proceedings, Annual Conference Series, 1995, XP 000546243, URL: http://www.cs.utexas.edu/users/fussell/courses/cs395t/lens.pdf.

*Primary Examiner* — Amandeep Saini
(74) *Attorney, Agent, or Firm* — Laurence A. Greenberg; Werner H. Stemer; Ralph E. Locher (57) ABSTRACT

The invention relates to a method and a device for generating at least one virtual image of a measurement object, in which a virtual position and/or a virtual orientation of the measurement object is determined and a virtual position and/or virtual orientation of at least one imaging or image recording device of a coordinate measuring machine is determined. The virtual image is generated on the basis of geometric data of the measurement object and on the basis of optical properties of the measurement object and the virtual image is additionally generated on the basis of imaging parameters of the imaging or image recording device.

23 Claims, 1 Drawing Sheet

(51) Int. Cl.
*G09B 19/24* (2006.01)
*G09B 23/06* (2006.01)
*G06T 15/04* (2011.01)
*G06T 15/20* (2011.01)
*G06T 15/50* (2011.01)

(52) U.S. Cl.
CPC .............. *G06T 15/50* (2013.01); *G09B 19/24* (2013.01); *G09B 23/06* (2013.01)

(58) Field of Classification Search
USPC ......................................................... 382/106
See application file for complete search history.

(56) References Cited

U.S. PATENT DOCUMENTS

| | | | |
|---|---|---|---|
| 8,606,549 | B2 | 12/2013 | Chang et al. |
| 9,025,855 | B1 | 5/2015 | Christoph et al. |
| 2004/0131244 | A1 | 7/2004 | Nehse et al. |
| 2005/0215879 | A1 | 9/2005 | Chuanggui |
| 2006/0061584 | A1* | 3/2006 | Kristiansen ............. G06T 15/04 345/582 |
| 2006/0072104 | A1 | 4/2006 | Engel et al. |

FOREIGN PATENT DOCUMENTS

| | | | |
|---|---|---|---|
| CN | 102326182 A | 1/2012 | |
| CN | 102542599 A | 7/2012 | |
| DE | 10327019 A1 | 12/2004 | |
| DE | 20221476 U1 | 2/2006 | |
| DE | 102007034168 A1 | 2/2009 | |
| DE | 102008025896 A1 | 11/2009 | |
| DE | 102010000473 A1 | 8/2010 | |
| DE | 102009034244 A1 | 1/2011 | |
| EP | 1026637 A2 * | 8/2000 | ............. G06T 15/00 |
| KR | 101566619 B1 * | 11/2015 | ............. G06T 7/004 |
| WO | 2009141333 A1 | 11/2009 | |

\* cited by examiner

METHOD AND DEVICE FOR GENERATING AT LEAST ONE VIRTUAL IMAGE OF A MEASUREMENT OBJECT

CROSS-REFERENCE TO RELATED APPLICATION

This application is a National Stage application, under 35 U.S.C. §371, of International Application PCT/EP2014/060824, filed May 26, 2014, which designated the United States; this application also claims the priority, under 35U.S.C. §119, of German Patent Application DE 10 2013 209 770.0, filed May 27, 2013; the prior applications are herewith incorporated by reference in their entirety.

BACKGROUND OF THE INVENTION

FIELD OF THE INVENTION

The invention relates to a method and device for generating at least one virtual image of a measurement object which is intended to be measured by a coordinate measurement machine.

Coordinate measurement machines are known which optically measure measurement objects, for example workpieces to be measured. To this end, such coordinate measuring machines include at least one imaging device by means of which it is possible to generate an image of the measurement object, geometric dimensions being determined on the basis of the image, for example.

Thus, DE 202 21 476 U1 describes an optical precision measurement instrument which comprises at least one image recording device and an associated image processing device. It is set forth in the publication that image information relating to synthetic generation of image scenes through simulation can be obtained in order to maximize detection stability while detecting edges and to minimize positional deviation while determining the position of an edge. This can necessitate knowledge about the reflection and transmission properties of the materials, the type of edge transition and the illumination conditions. It is possible to simulate image information relating to methods of computer simulation.

DE 10 2010 000 473 A1 describes a method for correcting projection data for CT reconstruction by means of a CT detector with pixels. In this case, a workpiece can be measured by means of a CT measurement. The document discloses that it is possible with the aid of simulation of imaging, preferably by simulation of beam weakening, scattering and/or detector sensitivity, to determine, from workpiece data, the required beam energies required for the respective orientation positions so that the radiographic images achieve an evaluable contrast.

DE 103 27 019 A1 describes a method for determining an imaging quality of an optical imaging system. So-called Zernike coefficients are used in this case to describe imaging quality.

For a desired measurement, in particular for a peak measurement, of a measurement object by a coordinate measurement machine, more or less complex test plans are generally made. They include, for example, information relating to a path along which, for example, a tactile or optical sensor of the coordinate measuring machine is to be moved relative to the measurement object during the measurement.

As a rule, such test plans can be devised in the case of the optical measurement only when the imaging device of the coordinate measurement machine is simultaneously operated, since decisions relating to the quality of a test plan can be made only on the basis of the generated images.

It is generally also necessary when training to operate such a coordinate measurement machine to operate the imaging device, since the desired training effect can be attained only on the basis of the generated images. However, it is disadvantageous in this case that in these circumstances only one person respectively can be trained in using a coordinate measuring machine, or there is a need to train more than one person on a coordinate measuring machine.

This results in the technical problem of providing a method and a device which enable processes which are based on images of an imaging device of a coordinate measuring machine to be carried out even without operating the imaging device, the processes being impaired in quality as little as possible.

It is a fundamental concept of the invention for an image generated by the imaging device of a coordinate measuring machine to be simulated as realistically as possible. During the simulation, the aim in this case is, in particular, to take account as realistically as possible of imaging properties of the imaging device and of the optical elements assigned to it, optical properties of the workpiece and illumination conditions.

BRIEF SUMMARY OF THE INVENTION

A method for generating at least one virtual image of a measurement object is proposed. Here, the measurement object denotes a measurement object which is to be measured by a coordinate measurement machine, in particular in optical fashion. The virtual image in this case simulates a real image generated by at least one imaging device of the coordinate measuring machine of a measurement object which is intended to be measured by the coordinate measuring machine.

In this process, a virtual position and/or virtual orientation of the measurement object is determined. The virtual position and/or orientation can be determined here in a virtual reference coordinate system. The virtual position and/or orientation can be determined, in particular, as a function of an actual position and/or orientation of the measurement object in the case of an actual measurement. The actual position and/or orientation can be determined in this case in a real reference coordinate system, for example in a machine coordinate system. In this case, the virtual position and/or orientation can be determined by a transformation of the actual position and/or orientation into the virtual reference coordinate system.

Also determined is a virtual position and/or virtual orientation of at least one imaging device of the coordinate measurement machine. This too, can be formed with reference to the virtual reference coordinate system. The virtual position and/or orientation of the imaging device can be determined, in particular, as a function of an actual position and/or orientation of the imaging device in the case of an actual measurement.

The virtual reference coordinate system can be, for example, a fixed coordinate system based on the imaging device.

The virtual image is also generated as a function of geometric data of the measurement object and as a function of optical properties of the measurement object. In this case, the virtual image is also determined as a function of the previously explained virtual positions and/or orientations.

Geometric data of the measurement object can, for example, be determined from CAD data (Computer aided design data). By way of example, it is possible as a function of the geometric data to determine a spatial configuration, in particular an arrangement, a topography and/or a profile of a surface, or of a plurality of regions of the surface of the measurement object. The geometric data may thus permit description and representation of the measurement object in the virtual reference coordinate system.

Optical properties of the measurement object in this case denote properties of the measurement object which influence electromagnetic radiation, in particular light, in particular also light in the visible wavelength region. For example, and not exclusively, the optical properties comprise transparency, reflection properties, scattering properties, diffraction properties, transmission properties, refraction properties, polarization properties, a texture and/or further properties which influence an interaction of the measurement object with light. The optical properties thereby permit a description of how the measurement objects emits radiation which can be used to generate images. In other words, it is possible thereby to describe the measurement object in the form of a radiometric source model. Here, the source model can also include a description of an illumination of the measurement object, for example as a function of the position and/or orientation and/or emission parameters of at least one light source, which are to be explained in more detail below. In this case, the source model combines the optical properties of the measurement object and the illumination properties. It is thereby possible to use the illumination model to simulate the emission characteristic resulting from specific illumination properties.

It is possible to determine the optical properties as a function of material properties of the measurement object. In this case, material properties include, for example, and once again not exclusively, a surface quality, a roughness, a color, a degree of luminosity, a density, a proportion and/or a distribution of an element in a material composition, structural properties and/or further material properties which describe the material interacting with the light, and the construction thereof.

It is also possible to determine the optical properties as a function of the geometric properties explained previously. For example, optical properties can be determined as a function of a topography of a surface of the measurement object.

The previously explained optical properties, material properties and geometric properties can be determined, in particular, for the regions or sections of the measurement object which interact with light during optical measurement, in particular for a surface or partial surfaces of a surface of the measurement object.

It is, of course, also possible to generate the virtual image as a function of optical properties of a measurement environment. Said optical properties correspond to the optical properties previously attributed to the measurement object, and relate to an environment of the measurement object. It is thereby possible, for example, to consider whether mist is present in a measurement environment.

According to the invention, the virtual image is additionally generated as a function of imaging parameters of the imaging device. Imaging parameters describe how an object arranged in a range of acquisition of the imaging device is imaged as a function of its spatial position and/or orientation, for example onto an image sensor. As explained below in more detail, this can also include the generation of electrical signals which represent the image. By way of example and not exclusively, in this case imaging parameters include an aperture, magnification or demagnification, an aspect ratio, a projection mode, an aperture angle, optical properties of the imaging device such as, for example, diffraction, scattering, refraction and polarization properties, a focal length, a quality of the antireflection coating, distortion properties, resolution of an image sensor, conversion properties of the image sensor with reference to the conversion of light into electrical signals (sensor parameters) and further properties which describe the generation of electrical signals and signals representing the image by the imaging device. As a function of imaging parameters, it is also possible to describe effects such as, for example lens reflections, distortions, a depth of focus, a chromatic aberration, aspheric lens refraction and so-called bokeh effects which occur during imaging.

The term imaging device in this case may also include optical elements for imaging, for example lenses, objectives, mirrors and further optical elements for beam guidance which are involved in the generation of the image by the imaging device. The imaging parameters thus also include the imaging parameters of the optical elements, in particular aberrations of an objective.

Imaging parameters can, for example, be described by so-called Zernike coefficients and/or by a point-spread function. Zernike coefficients in this case denote coefficients of a power series function for describing aberrations in imaging devices with reference to a measuring axis which, for example, can be an optical axis of the imaging device. Such Zernike coefficients are described in DE 103 27 019 A1 as a characteristic number for describing an image quality. Imaging parameters can also be dependent on wavelength, imaging parameters being determined as a function of wavelength.

Depending on the previously explained virtual positions and/or orientations of the measurement object and of the imaging device, it is then possible to determine a virtual position and/or orientation of the measurement object in the range of acquisition of the imaging device. It is therefore also possible to determine a working distance from the measurement object to the imaging device and/or to an optical element of the imaging device. It is also possible to determine a viewing angle and a profile of an optical axis relative to the measurement object.

The proposed method advantageously permits the generation of a virtual image which corresponds as accurately as possible to the actually generated image. The virtual image can be generated in this case in the form of electrical signals, for example in the form of bits, the electrical signals deviating as little as possible from electrical signals which are generated in the generation of an actual image. For example, the virtual image can be generated in such a way that a difference between amplitudes and/or a distribution of the electrical signals which represent the virtual image, and amplitudes and/or a distribution of the electrical signals which represent the corresponding actual image is smaller than a predetermined measure. By way of example, the previously explained optical properties, material properties and imaging parameters can be determined in such a way that the previously explained difference is smaller than the predetermined measure, for example for one or more of the reference images. As with actually generated images, the electrical signals can in this case encode or represent gray values of gray scale pictures, or color values of color images.

The generation of virtual images which correspond as accurately as possible to the corresponding actually generated images advantageously permits applications which are carried out as a function of images of the imaging device, also to be capable of being carried out without actual generation and therefore without actual operation of the imaging device. For example, a test plan can be devised and tested even without actual operation of the imaging device. In turn, this enables improved operation of the coordinate measuring machine, since applications, for example the test plans mentioned above, can be tested and optimized before operation, that is to say offline. For example, methods of image processing which are used to determine geometric dimensions of the measurement object, for example methods for edge detection, can also be tested and optimized as a function of virtual images. An actual measurement can then be performed in accordance with the test plans thus optimized.

In a further embodiment, a virtual position and/or virtual orientation of at least one light source is determined, the virtual image additionally being determined as a function of emission parameters of the light source. The virtual image can also be determined as a function of the virtual position and/or orientation of at least one light source.

The imaging is also dependent on prevailing illumination conditions during an actual measurement operation. Determination of the virtual position and/or orientation, for example in the previously explained virtual reference coordinate system, also enables the determination of the virtual position and/or orientation of the illumination source relative to the measurement object and to the imaging device. As is explained below in more detail, it is also possible to optimize a virtual position and/or orientation of the illumination source relative to the measurement object.

It is possible that a virtual position and/or orientation of the light source corresponds to the virtual position and/or orientation of the imaging device or can be determined as a function thereof, in particular when the actual light source is arranged fixed relative to the imaging device. For example, the light source can be connected in a mechanically rigid manner to the imaging device and can form a structural unit with the latter.

Emission parameters of the light source describe the emission of light by the light source. Emission parameters include, for example and not exclusively, an intensity, a wavelength or a spectral distribution of the emitted light, a spatial distribution of the emitted light, a polarization and a (main) beam direction of the emitted light and/or further emission parameters.

The number of the light sources actually present is already known for a coordinate measurement machine. Likewise, the position and/or orientation of the light sources actually present, for example relative to the imaging device, and their emission parameters are already known. The emission parameters can also, for example, be parameters which a user can adjust semi-automatically or fully automatically. Consequently, the virtual position and/or orientation and the emission parameters can be determined from said information already known.

For example, such a light source can be configured as a so-called ring light with a plurality of component light sources, which spatially includes at least part of the imaging device, for example an objective. A division or segmentation of the individual component light sources may already be known for such a ring light. This therefore also permits determination of the direction of irradiation of the ring light.

The quality of the generation of the virtual image can advantageously be further improved as a function of the emission parameters. In particular, so-called ray tracing methods can be applied as a function of the position and/or orientation and of the emission parameters. Said ray-tracing method is used to determine the calculation of a spatial profile of a light beam and the properties thereof along the spatial profile, the light beam being oriented from the measurement object or from the light source to the measuring device via the measurement object. This can be performed in particular, as a function of the previously explained spatial position and/or orientation of the measurement object, the imaging device, as a function of the optical properties, material properties and geometric properties of the measurement object, and as a function of the imaging properties of the imaging device. It is thereby possible to determine the calculation of an interaction which the measurement object and the imaging device exert on light beams emitted by at least one light source, and the changes, resulting therefrom, of properties of the light beams. That is to say, the simulation of the image generation is thereby improved.

Again, so-called rendering methods can be applied as a function of the position and/or orientation and of the emission parameters. In the rendering method, a spatial profile of a light beam and the properties thereof along the spatial profile are determined by calculation, the light beam being oriented from the imaging device to the measurement object or via the measurement object to the light source. Consequently, a measurement object is simulated such as it radiates in the case of a prescribed illumination. For example, it is possible in the rendering method to evaluate a so-called bidirectional reflection function and a light emission function for various wavelengths.

Thus, light beam propagation is calculated in both the ray-tracing method and rendering method, but with opposed directions of propagation. Here, the rendering method is generally more efficient since, for example, scattering and overillumination effects of the measurement field are considered only partially or not at all.

It is also possible, as a function of the virtual position and/or orientation of the at least one light source and of the emission parameters to determine whether a virtual direct-light image, a virtual transmitted-light image, a virtual bright image, a virtual dark image or a mixture of said image types is generated.

In a further embodiment, the imaging parameters of the imaging device comprise imaging parameters of at least one optical element of the imaging device. As previously explained, the imaging device can include optical elements for beam guidance, for example lenses, objectives or mirrors. These also influence properties of light beams which are converted into electrical signals to generate the image of the measurement object.

Consequently, the quality of the virtual image is further improved by taking account of imaging parameters of the optical elements.

In a further embodiment, the virtual position and/or virtual orientation of the measurement object and/or of the at least one imaging device are/is determined as a function of virtual motion parameters of at least one movable part of the coordinate measurement machine and/or as a function of geometric data of the coordinate measurement machine.

It is thereby advantageously possible to take account of a changing relative position and/or orientation between the measurement object and imaging device during an actual measurement, and/or of fixedly arranged parts of the coordinate measuring machine.

For example, the imaging device and/or the measurement object can be moved during measurement by at least one movable part of the coordinate measuring machine, in order to acquire different regions of the measurement object optically. In this case, however, there is also a change in the relative position and/or orientation, and thus in a profile and properties of the light beams which are converted into electrical signals in order to generate the image of the measurement object. The change in the relative position and/or orientation can be determined as a function of the virtual motion parameters of the coordinate measuring machine and, if appropriate, the spatial configuration of the coordinate measuring machine.

In addition to the geometric data of the workpiece previously explained, the optical properties of the workpiece and the imaging properties of the imaging device, the virtual image can also be generated as a function of geometric data of the coordinate measuring machine. Taking geometric data of the coordinate measuring machine into account advantageously enables an influence on movable and/or fixedly arranged parts of the coordinate measuring machine on the imaging of the measurement object, for example a shading or occlusion to also be taken into account.

The geometric data can be determined, for example, as a function of CAD data of the coordinate measuring machine. Geometric data can, in particular, also be determined as a function of movable axes, a position of rotary and/or swivel joints, and/or a position of a turntable of the coordinate measuring machine. It is also possible to determine a magnitude, a position and/or an orientation of a measurement volume of the coordinate measuring machine. This advantageously enables the restriction of a region which is really only relevant while generating virtual images. Thus, it is possible, for example, to determine parts and/or features of the measurement object which are arranged in the measurement volume and are therefore really only capable of being imaged. Also, interfering contours, for example contours of the coordinate measuring machine, which prevent or interfere with the generation of an image can be determined.

The relative spatial position and/or orientation of the imaging device to the measurement object in the virtual coordinate system can be determined as a function of motion parameters of movable parts, for example as a function of desired signals for actuators of the coordinate measuring machine. For this purpose, there may be a need for kinematic description of the coordinate measuring machine which enables a so-called forward calculation. The kinematic description can be performed in this case as a function of the actual geometric configuration or geometric data of the coordinate measuring machine, for example in the form of a function or in the form of transformation matrices.

This advantageously enables the generation of a plurality of virtual images which correspond to actual images which are generated at various positions along a path of the imaging device during measurement, it being possible to describe the path as a function of motion parameters of the movable parts. Thus, for example, it is conceivable to determine appropriate motion parameters as a function of a planned path, and then to determine a virtual image as a function of motion parameters for various relative positions and/or orientations along the path, as previously described. The quality of the desired path can then, in turn, be checked as a function of the generated virtual images. This therefore enables the qualitative checking of test plans without the need to operate the coordinate measuring machine. The checking can be carried out as a function of desired signals, as a result of which an idealized, error-free movement of the movable parts of the coordinate measuring machine is simulated. Alternatively, it is also possible during the movement to take account of already known correction data which describe known deviations from the error-free movement, for example rotation, tilting, rolling or a transverse movement of the movable parts of the coordinate measuring machine.

In a further embodiment, the virtual image is additionally determined as a function of sensor parameters of an image sensor of the imaging device.

Here, the image sensor denotes a means for converting electromagnetic radiation, in particular light, into electrical signals. Said means can, in turn, be converted into bits or bit sequences, said bits and bit sequences encoding information of an image. For example, the image sensor can be a CCD sensor or a CMOS sensor. Of course, other types of image sensors are also conceivable.

The above-described conversion is dependent here on sensor parameters. The latter describe, for example, a relationship between the intensity of the lights and, for example, an amplitude of the electrical signal. Again, sensor parameters can describe noise properties of the image sensor, for example in the form of a signal-to-noise ratio. Furthermore, said sensor parameters can describe a resolution, for example in the form of a pixel size, a chip size, control characteristics and dynamic properties. Dynamic properties can, for example, include properties of a photocurrent which is generated or released on an exposure of the image sensor with a predetermined intensity, a minimum or maximum exposure time and/or properties, for example nonlinearities, a signal conversion of light into electrons and then into bits.

It is also possible for sensor parameters to describe a reflectivity of the image sensor. The reflectivity can, for example, be dependent on a direction of irradiation. Consequently, reflectivity of the image sensor, which can, for example, generate so-called false light in the case of actual imaging, can also be taken into account directly or indirectly in the generation of the virtual image.

As a result, actual properties of the image sensor which affect the generation of an actual image can advantageously also be taken into account in the generation of a virtual image. This, in turn, advantageously permits an improvement in the quality of the virtual images generated in such a way that the latter deviate as little as possible from the corresponding actual images.

In a further embodiment, after generation of the virtual image at least one image processing method is applied to the virtual image, the image processing method simulating at least one aberration of the imaging device. The image processing method can be applied here to at least one pixel or a predetermined region of pixels. Here the simulation of aberrations is therefore performed not as a function of a description by means of imaging parameters, but by the application of an image processing method. Therefore no model-based generation of a virtual image but rather an event-based generation of a virtual image is performed.

The image processing method in this case denotes, for example, a mathematical operation which is applied to a value-based representation of the virtual image. By way of example, value-based means in this case that the mathematical operations take account of and/or vary intensity values, for example gray scale values, of pixels.

Such image processing methods include, for example, smoothing operations, filter operations and further operations for varying the intensity values of pixels. Again, such image processing methods can be used to simulate an effect, which can also be denoted as so-called crosstalk, passing from sensor elements, adjacent to a sensor element, of the image sensor onto said sensor element, which can arise in the event of an exposure and falsify the signal generated by the sensor element.

Consequently, it is advantageously possible to simulate imaging properties of adequate accuracy which could only be described with difficulty in a model-based fashion, in particular mathematically.

In a further embodiment, after generation of the virtual image at least one smoothing filter operation is applied to the virtual image. A strength of the smoothing filter operation is selected as a function of a distance of a point, imaged in one or more pixels, on the measurement object, from a focal plane of the imaging device. Here, a strength of the smoothing filter operation rises with the increasing distance of the imaged point from the focal plane. Said distance can, for example, be described as a function on the imaging properties of the imaging device. In ray-tracing methods, said distance can also be determined during the calculation of an optical path and stored. The smoothing filter operation can be applied in this case to the pixel or the pixels in which the corresponding point has been imaged.

The smoothing operation can, for example, comprise an averaging, in particular even a weighted averaging, a mean value of intensity values being calculated in a predetermined region of pixels. The predetermined region can in this case include the pixel or the pixels in which the corresponding point has been imaged. In this case, a magnitude of the predetermined region can be selected as a function of a strength. In particular, the region can become greater with rising strength.

Thus, for example, an intensity value of a pixel which images a point from the focal plane cannot be changed. A pixel which images a point far removed from the focal plane can be strongly blurred with adjacent pixels.

This advantageously enables a simple simulation of a depth of focus effect which brings about the previously explained effect in the generation of pixels of actual images. However, this is not performed in model-based fashion, but rather the proposed smoothing filter operation generates results which match the depth of focus effect. This is advantageous in particular when the previously explained ray-tracing method or rendering method is used, since said methods generate sharp virtual images.

Since the numerical aperture of the imaging device influences the depth of focus effect decisively, as previously explained said effect can, however, alternatively be simulated in the generation of the virtual image by taking account of the numerical aperture for determining the virtual image.

In a further embodiment, a (virtual) focal plane of the imaging device is determined, the virtual image corresponding to the part of the virtual measurement object arranged in the (virtual) focal plane. This means that in the generation of the virtual image account is taken exclusively of information from the (virtual) focal plane or from a predetermined region about said (virtual) focal plane. Consequently, it is only for the parts or regions of the virtual measurement object which are arranged in the (virtual) focal plane or in a region of predetermined magnitude about the focal plane that it is determined how the latter are imaged in a virtual image plane, or how said beams imaging parts or regions are converted into electrical signals.

In particular, a ray-tracing method or rendering method can be carried out exclusively for the parts or regions of the measurement object which are arranged in the (virtual) focal plane or in predetermined region about said focal plane. For example, the selection of the previously explained parts or regions can be performed by a so-called clipping function which permits the selection of specific depth regions during the ray-tracing method.

The generation of a virtual image can be simplified hereby in an advantageous way, in particular be accelerated, since less information need be taken into account by generating the virtual image.

In a further embodiment, at least one adjustable parameter of the at least one light source is adjusted as a function of a corresponding parameter in order to generate the virtual image. If the generation of the virtual image is, for example, carried out as a function of specific emission parameters of the at least one light source it is, for example, possible to adjust a variable parameter of the actual light source in accordance with the corresponding emission parameter. For example, an intensity of an actual light source can be adjusted in accordance with an intensity of the light source which is used in the generation of the virtual image. Alternatively or cumulatively, it is also possible for other ones of the previously explained emission parameters to be appropriately adjusted in the case of the actual light source.

Alternatively or cumulatively, at least one adjustable parameter of the coordinate measuring machine can be adjusted in accordance with the parameter taken into account in the generation of the virtual image. This holds true, in particular, for the previously explained motion parameters.

Alternatively or cumulatively, at least one adjustable parameter of the imaging device can be adjusted in accordance with the parameter taken into account in generating the virtual image. Such a parameter can be a focal length, for example.

Alternatively or cumulatively, at least one adjustable parameter of the optical sensor can be adjusted in accordance with the parameter taken into account in generating the virtual image. Such a parameter can be a sensitivity, for example.

This therefore advantageously enables the parameters used for simulation to be adopted for adjusting actual parameters, and thus for controlling an actual optical measurement. The adoption can be performed automatically in this case, or be initiated by an appropriate user input, for example. For this purpose, appropriate data can be transmitted from a device for generating the at least one virtual image to one or more appropriate control devices of the coordinate measuring machine.

The proposed method advantageously enables the realistic simulation of a recording of an image by an imaging device of a coordinate measuring machine. As the image is being recorded, a user or else an algorithm for automatic adjustment can assess an image section, a suitable magnification, a suitable working distance and further adjustable parameters, for example as a function of virtual images, generated in this way, for the actual optical measurement of a workpiece. Parameters used for the simulation can then be used to control the coordinate measuring machine.

Again, methods for detecting and determining features and for focus measurement can be tested as a function of the virtual images generated. By way of example, it is thus possible to prepare a test plan which enables a desired measurement of the measurement object before the actual measurement, that is to say offline.

Furthermore, the proposed method can also be used to test methods for evaluating actually generated images, for example methods for image-based measurement of measurement objects. For example, methods, in particular also image processing methods, for feature detection, edge detection and edge measurement can be carried out as a function of the virtual images.

A user can also generate virtual images with various parameters, for example with various illumination intensities, with various motion parameters, with various virtual positions and/or orientations etc., and can use the virtual images generated in order to determine the optimum parameters for a measurement actually used. This can be performed individually for each measurement task, that is to say for each measurement object, or even for one, several or all feature(s) or (partial) structures to be measured on a measurement object.

Again, it is possible to optimize results of the previously explained methods for evaluation as a function of the virtual images. Here, parameters which are used to generate the virtual images and which correspond to appropriate, adjustable parameters for an actual measurement can be varied in such a way that results are optimized. An optimum result can be obtained, for example, if a deviation of a result, for example a geometric dimension, a method for evaluating a real result, for example a real dimension, is minimum. For example, emission parameters, adjustable in this way, of a light source, adjustable motion parameters of the coordinate measuring machine, adjustable imaging properties of the imaging device and relative positions and/or orientations of the measurement object and/or of the at least one light source and/or of the at least one imaging device can be determined relative to one another so as to enable as accurate an optical measurement of a measurement object as possible.

By way of example, the determination of parameters that are optimum in this way can be performed here by iteration or by parameter optimization methods, virtual images being used to determine the optimum parameters. For example, known methods for determining optimum parameters which use images actually generated can be used to determine appropriate optimum parameters as a function of the virtual images.

Of course, the determination of the optimum parameters, in particular of optimum emission parameters can be carried out manually, semi-automatically or else fully automatically.

It is also possible to run through parts of the sequence. For example, it is possible to determine only optimum, adjustable parameters, for example an intensity, of at least one light source or only optimum, adjustable parameters, for example a focus, of the imaging device.

Again, CAD data of a desired measurement object to be measured can be read in and the proposed generation of virtual images can therefore be carried out for each desired measurement object. Consequently, appropriate demonstration of the mode of operation of a predetermined, coordinate measurement machine for optical measurement, for example, can be performed directly for a customer, the imaging properties and, if appropriate, the emission properties of light sources of the predetermined coordinate measuring machine being known.

The method also advantageously enables the determination of optimum adjustable parameters of a plurality of coordinate measurement machines, for example a plurality of coordinate measurement machines of a series by means of which for example the same or similar measurement objects are to be measured. For this purpose, virtual images with normalized adjustable parameters can be generated. In particular, normalized adjustable parameters can be determined in such a way that, as previously explained, a measurement result is optimized.

It is then possible as a function of the normalized parameters determined by the optimization, to determine, for each of the plurality of coordinate measuring machines, corresponding parameters which are adjusted for the actual measurement. In this case, a relationship between the normalized parameters and parameters actually be adjusted may be known in advance for each coordinate measuring machine. Said relationship can, for example, be determined by determining parameters actually to be adjusted for each coordinate measuring machine, for example in a calibration method, in such a way that the same measurement result is attained. Said parameter set then forms a reference parameter set, specific to a measuring device, for normalized parameters. For example, normalized parameters can be specified relative to the reference parameter set.

By way of example, adjustable parameters for each light source or each group of a plurality of light sources of each coordinate measurement machine can be determined in such a way that a reference intensity is generated in the case of which an illuminated reference object generates a predetermined illumination, for example 95%, of the image sensor of the imaging device. For example, the reference object can be a white, diffusely reflecting object with a predetermined reflectivity of, for example, 50%, in particular a ceramic disk. Said parameters form the reference parameter set for the respective coordinate measuring machine.

A virtual image can then be determined as a function of said intensity and/or of a predetermined percentage of said reference intensity. By way of example, if an intensity which amounts only to a portion of the reference intensity is determined as the optimum intensity, it is then possible to determine the corresponding parameters for a coordinate measuring machine in such a way that only the corresponding proportion is generated. In particular, it is also possible to carry out the optimization previously explained, the proportion of the reference intensity being changed.

The determination of virtual images as a function of proportions of the reference intensity advantageously does not necessarily require a renewed calculation of the beam propagation by ray-tracing or rendering methods, since intensities of the virtual image which have been determined as a function of the reference intensity can be scaled only in accordance with the predetermined proportion. Said approximation is all the is better the less the further emission parameters such as, for example, beam angle, spectrum, average wavelength and polarization depend on the intensity.

This advantageously enables the determination of adjustable parameters for an optimum test plan by only one simulation or a simulation scenario and a corresponding transfer to a plurality of similar coordinate measuring machines.

Also described is a computer program product in or on which a code for executing one of the above explained methods is stored. In particular, the computer program product can include a computer program which has software means for carrying out one of the above explained methods, when the computer program is executed in an automation system.

In a further embodiment, a measurement accuracy of a coordinate measuring machine, in particular the accuracy of the optical measurement of a measurement object carried out by the coordinate measuring machine is determined as a function of the virtual image. For example, at least one geometric property of the measurement object which can be determined as a function of the previously known geometric data of the measurement object can be compared with a corresponding geometric property, determined in an image-based fashion, which is determined as a function of the virtual image. A comparison can, for example, be performed by forming the difference between the geometric property and the geometric property determined in an image-based fashion. The measurement accuracy can then be determined as a function of the comparison or of the difference.

A geometric property can in this case include structural sizes of (partial) structures of the measurement object, by way of example and not exclusively, a width, a length, a depth, a diameter, an area, a location or position, an orientation of a (partial) structure of the measurement object. The (partial) structure can be a line, an edge, an opening, for example.

This advantageously enables a measurement accuracy which is achieved with a test plan, for example, to be assessed before actually carrying out the test plan.

Again, it is thus possible to determine an influence on the measurement accuracy of a change in one or more, in particular adjustable parameters. This can also be denoted as parameter-dependent sensitivity.

In a further embodiment, a measurement accuracy of various methods for image-based measurement of a measurement object is compared as a function of the virtual image.

The previously explained image-based determination of geometric properties from a virtual or actual image of the measurement object is performed at least partially by image processing methods. By way of example, it is possible here to apply methods for structural detection, for example detection of edges or lines. Again, it is possible to apply methods for image improvement, for example filter methods for noise reduction. It is also possible to apply methods for determining a pixel position and a distance between various pixels. If an appropriate conversion factor or an appropriate conversion rule is known, it is thereby possible to convert these properties determined in an image-based fashion, that is to say, for example, positions, distances, orientations into corresponding, actual properties.

If there exists a plurality of image processing methods which can be carried out alternatively or cumulatively for the purpose of image-based determination of geometric properties, then it is possible to compare the geometric properties determined as a function of a first image processing method or of a first sequence of various image processing methods with geometric properties which have been determined as a function of a further image processing method or a further sequence of various image processing methods. This is possible because the same virtual image is used as raw image for the compared image processing methods and/or sequences of image processing methods.

Again, as previously explained, the geometric properties determined with the various image processing methods can be compared with corresponding geometric properties which can be determined as a function of the already known geometric data of the measurement object.

Consequently, it is advantageously possible to compare the various image processing methods or sequences for the same set of, in particular adjustable, parameters. Thus it is possible, in particular, to select an image processing method or a sequence which has the highest measurement accuracy for the set of parameters.

Again, it is thereby possible to determine an influence of a variation of one or more, in particular adjustable parameters of the coordinate measurement machine and/or of the light source and/or of the imaging device on the measurement accuracy of various image processing methods or sequences of image processing methods. Consequently, it is possible by way of example to switch over between various image processing methods or various sequences of image processing methods when parameters change. In particular, it is possible to switch over between various image processing methods or various sequences of image processing methods so as respectively to select for a current set of parameters the image processing methods or sequence of image processing methods, the measurement of which accuracy is highest for the current set of parameters. The method or sequence selected in such a way can then also be applied in a corresponding actual measurement operation.

Also proposed is a device for generating at least one virtual image of a measurement object, the device including at least one control and evaluation device, it being possible to use the control and evaluation device to determine a virtual position and/or virtual orientation of the measurement object, and a virtual position and/or virtual orientation of at least one imaging device of the coordinate measurement machine, it being possible to generate the virtual image as a function of geometric data of the measurement object and as a function of optical properties of the measurement object.

According to the invention, the virtual image can additionally be generated as a function of imaging parameters of the imaging device. The control and evaluation device can be appropriately configured for this purpose.

The proposed coordinate measurement machine advantageously enables one of the methods explained above to be carried out.

Here, the evaluation and control device can be connected by signaling or data processing to further control devices of the coordinate measurement machine. In this case, parameters of the control and evaluation device which are used to generate the virtual image are transmitted to the further control devices, the further control devices adjusting, as a function of the transmitted parameters, corresponding, adjustable parameters of the coordinate measurement machine and/or the at least one light source and/or the imaging device. For this purpose, the parameters used to generate the virtual image are converted appropriately, for example by means of an already known conversion rule.

BRIEF DESCRIPTION OF THE SEVERAL VIEWS OF THE DRAWING

The invention is explained in more detail with the aid of an exemplary embodiment. The sole FIGURE shows a schematic flowchart of a method according to the invention.

DESCRIPTION OF THE INVENTION

Figure 1:
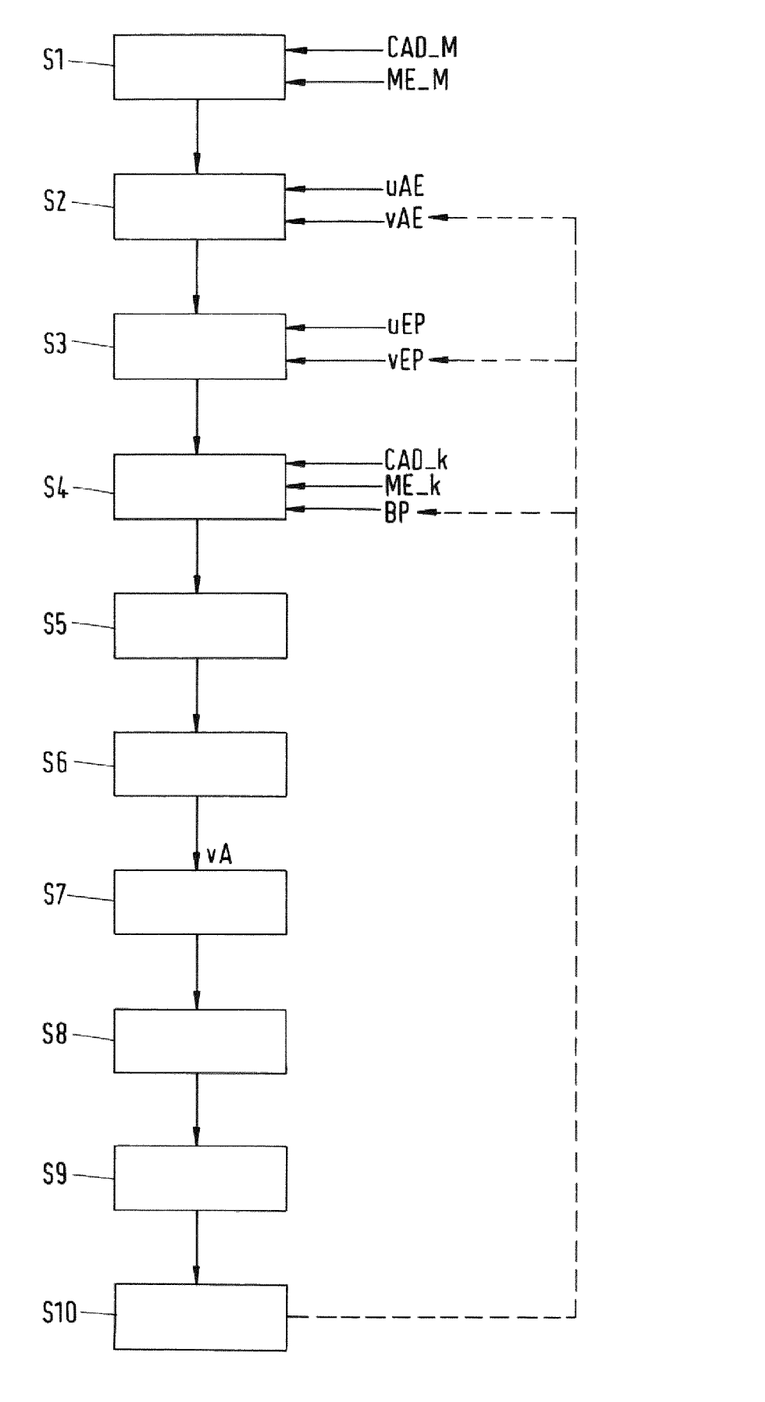

In a first step S1, CAD data CAD_M of a measurement object to be measured are input. Material properties ME_M of the measurement object to be measured are also input. These also include properties of a surface of the measurement object, for example a surface quality and a degree of gloss. Optical properties of the measurement object to be measured, in particular for various partial regions of the measurement object, can be determined as a function of the material properties ME_M and of the geometric properties determined from the CAD data CAD_M. By way of example, optical properties of various materials and material compounds can be stored for this purpose in a memory device. Optical properties include, in particular, properties of reflection, transmission, diffraction and scattering for the measurement object.

In a second step S2, imaging parameters uAE, vAE of an imaging device, for example a camera, of the coordinate measurement machine are input. These include invariable imaging parameters uAE and variable imaging parameters vAE. Imaging parameters uAE, vAE in this case also include sensor parameters of an image sensor of the imaging device. Variable imaging parameters vAE in this case include, for example, a focal length, a working distance from the measurement object, a numerical aperture and telecentric properties.

In a third step S3, emission parameters uEP, vEP of all light sources of the coordinate measurement machine are input. These include, in turn, invariable emission parameters uEP and variable emission parameters vEP. Variable emission parameters vEP in this case include, for example, an intensity of the generated light, a wavelength, an on time and a turn-on time.

In a fourth step S4, CAD data CAD_k and material properties ME_k of the coordinate measurement machine are input. Motion parameters BP of the coordinate measurement machine are also input. The motion parameters BP in this case include desired positions of drive devices, in particular linear and/or rotary drive devices, of the coordinate measurement machine, for example motion parameters BP of the movable axles and joints of the coordinate measurement machine, and motion parameters BP of a turntable on which the measurement object to be measured is arranged for actual measurement.

In a fifth step S5, a relative position and/or orientation of the virtual measurement object is determined in relation to the imaging device, and a relative position and/or orientation of the light sources is determined in relation to the virtual measurement object in a virtual reference coordinate system. For this purpose, it is possible to determine a virtual position and/or orientation of the measurement object, of the imaging device and of the light sources in the virtual reference coordinate system.

This determination of the virtual position and/or orientation of the imaging device and of the measurement object can be performed, for example, as a function of the motion parameters BP of the coordinate measurement machine, and of the CAD data of the coordinate measurement machine.

In a sixth step S6, a ray-tracing method or a rendering method, which takes account computationally of the previously input properties, determines a distribution of a beam intensity in a virtual image plane. The electrical signals which are generated by the optical sensor for the given distribution of the beam intensity can then be determined as a function of the sensor parameters. Intensity variables, in particular in the form of bits, of pixels of a virtual image vA can now be determined by taking account, if appropriate, of further signal conversions.

In a seventh step S7, a smoothing filter operation is applied to pixels of the virtual image vA, an intensity of the smoothing filter operation being selected as a function of distances of the points, which are imaged in said pixels, from a focal plane of the imaging device.

In an eighth step S8, known methods for evaluating images, for example for image-based measurement of optically imaged measurement objects are then applied to the virtual image vA in order to determine geometric dimensions of the measurement object from which the virtual image vA has been generated.

Said dimensions can be compared in a ninth step S9 to dimensions which have been determined as a function of the CAD data CAD_M of the measurement object. It is then possible in a tenth step S10 to vary the variable imaging properties vAE and emission parameters vEP and motion parameters BP of the coordinate measurement machine, and to carry out the method again starting from the second step S2. By way of example, the variation can be performed in such a way that or until a difference of the dimensions determined in the ninth step S9 is at a minimum or undershoots a predetermined measure.

The invention claimed is:

1. A method for determining adjustable parameters of a plurality of coordinate measurement machines, the method comprising the following steps:
   generating at least one virtual image of a measurement object;
   determining at least one of a virtual position or a virtual orientation of the measurement object;
   determining at least one of a virtual position or a virtual orientation of at least one imaging device of a coordinate measurement machine;
   generating the virtual image as a function of geometric data of the measurement object and as a function of optical properties of the measurement object;
   additionally generating the virtual image as a function of imaging parameters of the at least one imaging device;
   generating the virtual image with normalized adjustable parameters; and
   determining corresponding parameters being adjustable for actual measurement for each of the plurality of coordinate measurement machines as a function of the normalized parameters.

2. The method according to claim 1, which further comprises determining at least one of a virtual position or a virtual orientation of at least one light source, and additionally determining the virtual image as a function of emission parameters of the at least one light source.

3. The method according to claim 2, which further comprises adjusting at least one adjustable parameter of at least one of the at least one light source or the coordinate measurement machine or the at least one imaging device as a function of a corresponding parameter used to generate the virtual image.

4. The method according to claim 1, wherein the imaging parameters of the at least one imaging device include imaging parameters of at least one optical element of the at least one imaging device.

5. The method according to claim 1, which further comprises determining at least one of the virtual position or the virtual orientation of the measurement object or of the at least one imaging device as a function of at least one of virtual motion parameters of at least one movable part of the coordinate measurement machine or as a function of geometric data of the coordinate measurement machine.

6. The method according to claim 1, which further comprises additionally determining the virtual image as a function of sensor parameters of an image sensor of the at least one imaging device.

7. The method according to claim 1, which further comprises applying at least one image processing method to the virtual image after generation of the virtual image, the image processing method simulating at least one aberration of the at least one imaging device.

8. The method according to claim 7, which further comprises applying at least one smoothing filter operation to the virtual image after generation of the virtual image, and selecting a strength of the at least one smoothing filter operation as a function of a distance of a point, imaged in one or more pixels, on the measurement object, from a focal plane of the at least one imaging device.

9. The method according to claim 1, which further comprises determining a focal plane of the at least one imaging device, the virtual image corresponding to a part of the virtual measurement object disposed in the focal plane or in a predetermined region around the focal plane.

10. The method according to claim 1, which further comprises determining a measurement accuracy of a coordinate measuring machine as a function of the virtual image.

11. The method according to claim 1, which further comprises comparing a measurement accuracy of methods for image-based measurement of a measurement object, as a function of the virtual image.

12. A non-transitory computer program product, comprising a code stored in or on the computer program product for carrying out a method according to claim 1.

13. A method for generating at least one virtual image of a measurement object, the method comprising the following steps:
   determining at least one of a virtual position or a virtual orientation of the measurement object;
   determining at least one of a virtual position or a virtual orientation of at least one imaging device of a coordinate measurement machine;
   generating the virtual image as a function of geometric data of the measurement object and as a function of optical properties of the measurement object;
   additionally generating the virtual image as a function of imaging parameters of the at least one imaging device; and
   additionally determining the virtual image as a function of sensor parameters of an image sensor of the imaging device.

14. The method according to claim 13, which further comprises determining at least one of a virtual position or a virtual orientation of at least one light source, and additionally determining the virtual image as a function of emission parameters of the at least one light source.

15. The method according to claim 14, which further comprises adjusting at least one adjustable parameter of at least one of the at least one light source or the coordinate measurement machine or the at least one imaging device as a function of a corresponding parameter used to generate the virtual image.

16. The method according to claim 13, wherein the imaging parameters of the at least one imaging device include imaging parameters of at least one optical element of the at least one imaging device.

17. The method according to claim 13, which further comprises determining at least one of the virtual position or the virtual orientation of the measurement object or of the at least one imaging device as a function of at least one of virtual motion parameters of at least one movable part of the coordinate measurement machine or as a function of geometric data of the coordinate measurement machine.

18. The method according to claim 13, which further comprises applying at least one image processing method to the virtual image after generation of the virtual image, the image processing method simulating at least one aberration of the at least one imaging device.

19. The method according to claim 18, which further comprises applying at least one smoothing filter operation to the virtual image after generation of the virtual image, and selecting a strength of the at least one smoothing filter operation as a function of a distance of a point, imaged in one or more pixels, on the measurement object, from a focal plane of the at least one imaging device.

20. The method according to claim 13, which further comprises determining a focal plane of the at least one imaging device, the virtual image corresponding to a part of the virtual measurement object disposed in the focal plane or in a predetermined region around the focal plane.

21. The method according to claim 13, which further comprises determining a measurement accuracy of a coordinate measuring machine as a function of the virtual image.

22. The method according to claim 13, which further comprises comparing a measurement accuracy of methods for image-based measurement of a measurement object, as a function of the virtual image.

23. A device for generating at least one virtual image of a measurement object, the device comprising:
   at least one control and evaluation device configured to determine at least one of a virtual position or a virtual orientation of the measurement object and at least one of a virtual position or a virtual orientation of at least one imaging device of a coordinate measurement machine;
   the measurement object having geometric data and optical properties as a function of which the virtual image can be generated;
   the at least one imaging device having imaging parameters as a function of which the virtual image can additionally be generated; and
   the at least one imaging device having an image sensor with sensor parameters as a function of which the virtual image can additionally be determined.

* * * * *